United States Patent
Bathen et al.

(10) Patent No.: US 11,159,307 B2
(45) Date of Patent: Oct. 26, 2021

(54) AD-HOC TRUSTED GROUPS ON A BLOCKCHAIN

(71) Applicant: International Business Machines Corporation, Armonk, NY (US)

(72) Inventors: Luis Angel D. Bathen, Placentia, CA (US); Dulce B. Ponceleon, Palo Alto, CA (US); Marc H. Coq, Poughkeepsie, NY (US); Colette Manoni, Brewster, NY (US); Collin Walling, Poughkeepsie, NY (US); Corey McQuay, Poughkeepsie, NY (US); Eugene E. Nitka, Poughkeepsie, NY (US); Trent Balta, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 16/058,198

(22) Filed: Aug. 8, 2018

(65) Prior Publication Data
US 2020/0052880 A1    Feb. 13, 2020

(51) Int. Cl.
*G06F 21/00*    (2013.01)
*H04L 9/06*    (2006.01)
(Continued)

(52) U.S. Cl.
CPC .......... *H04L 9/0637* (2013.01); *H04L 9/0833* (2013.01); *H04L 9/14* (2013.01); *H04L 9/3073* (2013.01)

(58) Field of Classification Search
CPC ....... H04L 9/0637; H04L 9/14; H04L 9/0833; H04L 9/3073; H04L 63/102; H04L 63/065; H04L 9/3239; H04L 2209/38
See application file for complete search history.

(56) References Cited

U.S. PATENT DOCUMENTS 9,673,973 B1    6/2017 Leavy et al.
10,915,552 B2 *    2/2021 Camenisch ........... H04L 9/3247
(Continued)

OTHER PUBLICATIONS

Bahga et al. "Blockchain Platform for Industrial Internet of Things," Journal of Software Engineering Applications 9.10 (2016): 533-546.See Sections 3-5.

*Primary Examiner* — Kendall Dolly

(57) ABSTRACT

An example operation may include one or more of identifying a group of blockchain member devices attempting to establish a trusted group communication channel, assigning each of the blockchain member devices public/private key pairs, publishing the public keys of the blockchain member devices in a list, identifying a request from a first blockchain member device requesting a private key, associated with a second blockchain member device, be applied to a predetermined nonce value, responsive to identifying a response to the request, verifying, via a public key assigned to the first blockchain member device, that the second blockchain member device is a trusted member of the group of blockchain member devices, and responsive to verifying the second blockchain member device is a trusted member of the group of blockchain member devices, permitting communication between the first blockchain member device and the second blockchain member device on the trusted group communication channel.

20 Claims, 13 Drawing Sheets

(51) Int. Cl.
*H04L 9/14* (2006.01)
*H04L 9/08* (2006.01)
*H04L 9/30* (2006.01)

(56) References Cited

U.S. PATENT DOCUMENTS

| | | | |
|---|---|---|---|
| 10,936,723 B2 * | 3/2021 | Gopalakrishnan | G06F 21/575 |
| 2015/0127949 A1 | 5/2015 | Patil et al. | |
| 2017/0048217 A1 * | 2/2017 | Biggs | H04L 63/123 |
| 2017/0134937 A1 | 5/2017 | Miller et al. | |
| 2017/0180469 A1 | 6/2017 | Ford et al. | |
| 2017/0316390 A1 * | 11/2017 | Smith | H04L 9/3242 |
| 2017/0359288 A1 | 12/2017 | Golan | |
| 2018/0041487 A1 * | 2/2018 | Wang | H04W 12/069 |
| 2019/0012595 A1 * | 1/2019 | Beser | H04L 9/3239 |
| 2019/0220603 A1 * | 7/2019 | Gopalakrishnan | H04L 9/3239 |
| 2020/0151350 A1 * | 5/2020 | Irazabal | H04L 9/0637 |

* cited by examiner

AD-HOC TRUSTED GROUPS ON A BLOCKCHAIN

TECHNICAL FIELD

This application generally relates to managing trusted groups, and more particularly, to establishing ad-hoc trusted groups on a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in a blockchain's blocks, which are secured from tampering and revision due to their immutable properties. Each block contains a timestamp and a link to a previous block. Blockchain can be used to hold, track, transfer and verify information. Since a blockchain is a distributed system, before adding a transaction to a blockchain ledger, all peers need to reach a consensus status.

Conventionally, secure/trusted communication is often managed through encryption, from very primitive Greek ciphers to more modern schemes used today (e.g., secure socket layer (SSL) and transport layer security (TLS) protocols), and which are adopted by web users. Most schemes are either symmetric or asymmetric types. Symmetric cryptography is based on the assumption that parties have exchanged a predetermined encryption/decryption key prior to communicating. Such schemes assume that parties know each other, and thus, in today's connected world, such schemes would require every device connected to the web to know every single key for every single device in order to communicate. Asymmetric encryption is the de facto standard for any sort of secure online communication protocol. Today, public key infrastructures are used to manage keys, and trusted central authorities are used to sign digital certificates in order to verify users. Digital certificates are used to prove ownership of a given public key, which enables trusted web communication configured on top of the SSL/TLS protocols. One drawback of such schemes is that public key infrastructures (PKIs) are often centralized, and certificate authorities (CAs) need to be reached to issue/verify certificates. Also, there may be a need to build ad-hoc secure channel(s), and the necessary infrastructure to issue and validate certificates/public keys is not present for those spur of the moment types of communication efforts. Although, there are many schemes to build secure channels, most schemes lack efficient tools to protect against, not just man-in-the-middle attacks, but also against infrastructure failures, DDoS attacks, as well as a lack of a centralized trusted third party. A typical SSL connection establishes a secure channel between two parties. HTTPS connections perform something similar, where trusted certificates are stored in most modern web browsers. Those concepts rely on storing all trusted certificates or trusted parties in some sort of certificate store.

SUMMARY

One example embodiment may provide a method that includes one or more of identifying a group of blockchain member devices attempting to establish a trusted group communication channel, assigning each of the blockchain member devices public/private key pairs, publishing the public keys of the blockchain member devices in a list, identifying a request from a first blockchain member device requesting a private key, associated with a second blockchain member device, be applied to a predetermined nonce value, responsive to identifying a response to the request, verifying, via a public key assigned to the first blockchain member device, that the second blockchain member device is a trusted member of the group of blockchain member devices, and responsive to verifying the second blockchain member device is a trusted member of the group of blockchain member devices, permitting communication between the first blockchain member device and the second blockchain member device on the trusted group communication channel.

Another example embodiment may include a system that includes a group of blockchain member devices identified as a trusted group configured to communicate over a trusted group communication channel, a computing device configured to assign each of the blockchain member devices public/private key pairs, publish the public keys of the blockchain member devices in a list, identify a request from a first blockchain member device requesting a private key, associated with a second blockchain member device, be applied to a predetermined nonce value, responsive to a response to the request being identified, verify, via a public key assigned to the first blockchain member device, that the second blockchain member device is a trusted member of the group of blockchain member devices, and responsive to the second blockchain member device being verified as a trusted member of the group of blockchain member devices, permit communication between the first blockchain member device and the second blockchain member device on the trusted group communication channel.

Yet another example embodiment provides a non-transitory computer readable storage medium configured to store instructions that when executed cause a processor to perform one or more of identifying a group of blockchain member devices attempting to establish a trusted group communication channel, assigning each of the blockchain member devices public/private key pairs, publishing the public keys of the blockchain member devices in a list, identifying a request from a first blockchain member device requesting a private key, associated with a second blockchain member device, be applied to a predetermined nonce value, responsive to identifying a response to the request, verifying, via a public key assigned to the first blockchain member device, that the second blockchain member device is a trusted member of the group of blockchain member devices, and responsive to verifying the second blockchain member device is a trusted member of the group of blockchain member devices, permitting communication between the first blockchain member device and the second blockchain member device on the trusted group communication channel.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide a transaction ledger based on a blockchain infrastructure. A blockchain may provide a shared ledger to create a trusted group within a blockchain member network. In this configuration, the blockchain may provide a backend for PKI/CA security requirements and provide a medium to exchange messages between users/devices identified by respective user profiles. A customized protocol enabled by the blockchain could provide an ad-hoc secure communication channel over the blockchain network for a group of member devices. The blockchain may provide a way for users to build a trusted channel in an otherwise untrusted fabric without relying on a centralized/trusted party for security management.

Figure 1A:
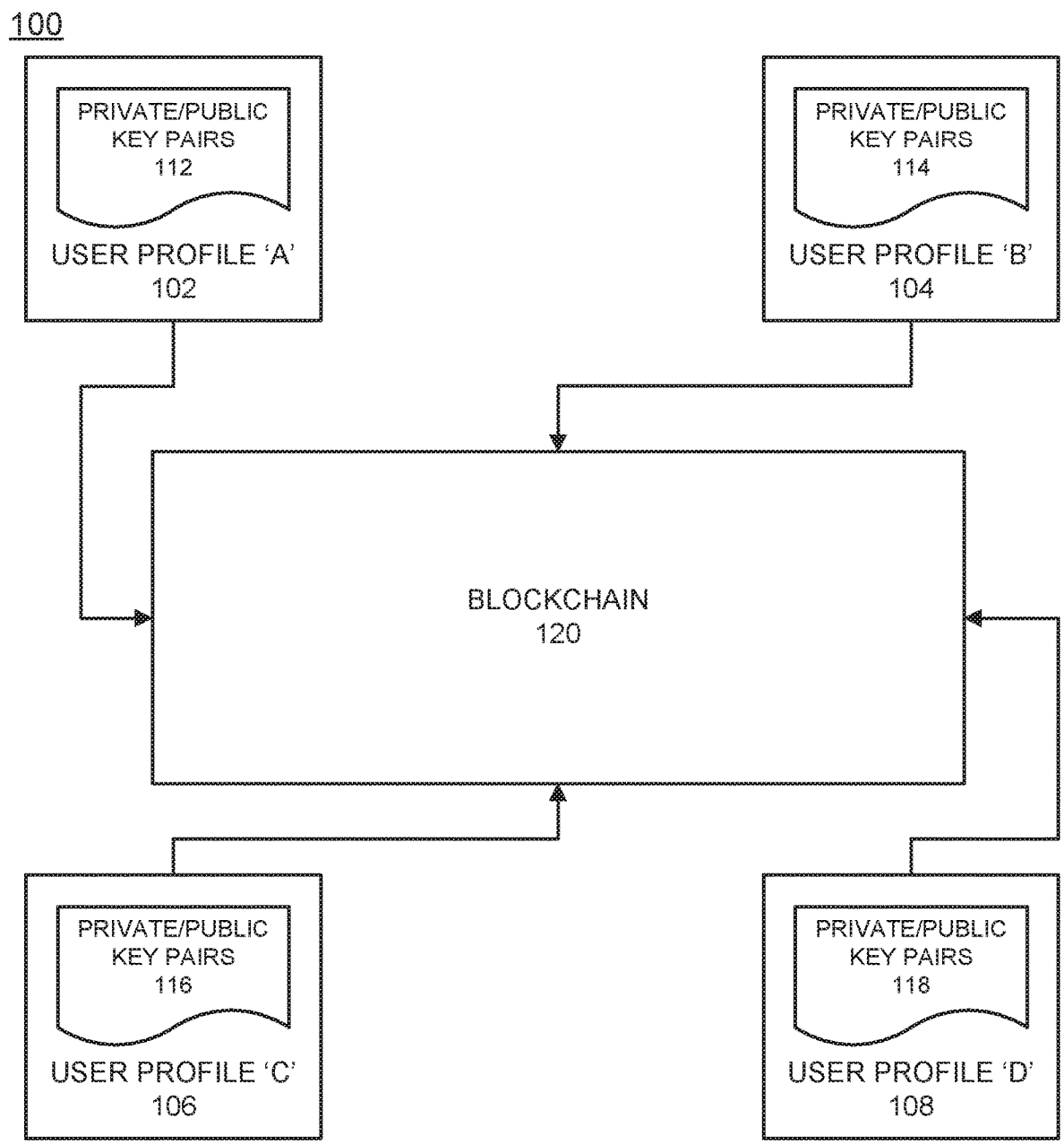
FIG. 1A illustrates a logic configuration of an untrusted network of members attempting to form a trust network with a blockchain, according to example embodiments.

FIG. 1A illustrates a logic configuration of an untrusted network of members attempting to form a trust network with a blockchain, according to example embodiments. Referring to FIG. 1A, the configuration 100 provides a scenario where multiple users/user profiles/user devices 102, 104, 106 and 108 are active blockchain members of a blockchain 120. Any number of members who belong to a trusted list (i.e., certified list) may be able to establish a secure communication channel and exchange messages among themselves in a trusted manner. Data will be encrypted with ephemeral keys in order to provide forward secrecy, in case a group member is compromised, as well as time-based channels, which requires users/groups to re-build their groups/cliques after a certain period of time has lapsed. By using hierarchical deterministic keys or randomly generated keys, this configuration can be used by IoT devices that desire to communicate, and exchange data in another untrusted fabric. This configuration would permit any type of device, such as Internet of things (IoT) devices to 'wake-up' periodically, request the creation of an ad-hoc trusted group, transfer data among themselves, and go back to sleep (i.e., expire, go-offline, etc.). A blockchain could be used as the data management platform for all devices to exchange data onto the ledger without having to system failures, whether it be due to server failures or DDoS attacks.

In FIG. 1A, the group of user devices identified by their profiles (A-D) may desire to communicate in a public blockchain fabric, which could be permissioned/permissionless. In this example, there are three parties which have clients capable of generating hierarchical deterministic keys (HD keys) in case a policy requires key generation to be deterministic for audit requirements.

In operation, each member device may have been assigned a unique private/public key pair (e.g., 112, 114, 116 and 118). In order of be able to communicate among themselves, the members need to exchange public keys, so that they may encrypt data that can only be decrypted by the intended party with knowledge of those keys, verify that the public keys being presented to them are valid, and then learn which members are trusted parties in this communication event, or at least, who they could trust for purposes of communication.

Figure 1B:
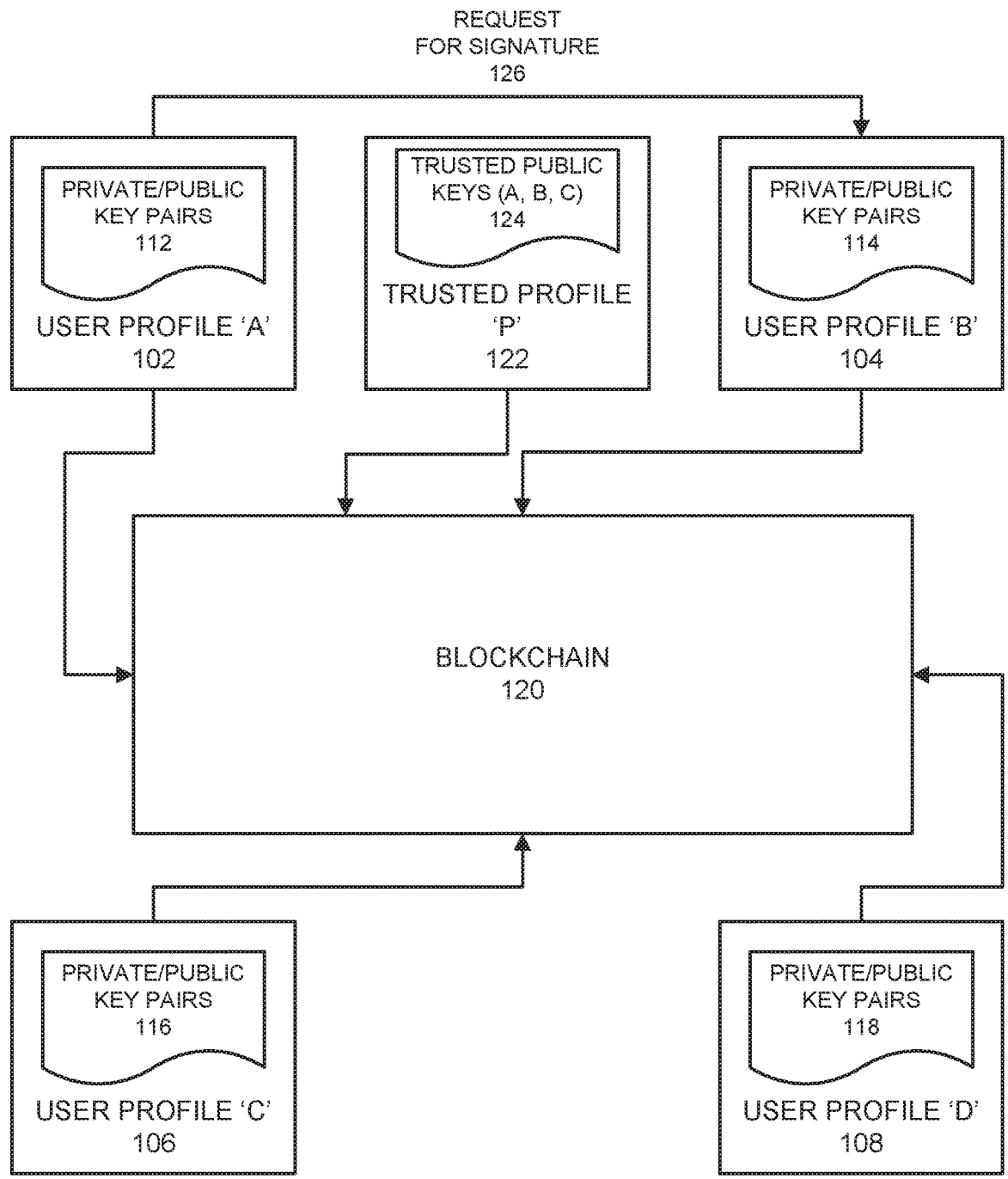
FIG. 1B illustrates a logic configuration of an untrusted network of members attempting to form a trust network with a blockchain by adding a trust party list, according to example embodiments.

FIG. 1B illustrates a logic configuration of an untrusted network of members attempting to form a trust network with a blockchain by adding a trust party list, according to example embodiments. Referring to FIG. 1B, building upon the foundation of FIG. 1A, like reference numerals refer to like elements, throughout all examples. In this example configuration 130, an oracle list (trusted party list) may be created by a trusted profile 122 and/or device that generates public keys 124 for those members in the defined group. In this example, only three of the four members present are invited into the group. In this example, each device, or software client, will be preloaded with a trusted party (P) certificate, and each enterprise, agency, group of friends, who desires to enable the software clients/IoT devices to communicate over the untrusted blockchain fabric, will publish a trusted list of public keys and signatures. Each device/software client will have one set of static public/private key pairs (e.g., 112, 114, 116, 118) as well as one blockchain address used for communication. The generated list does not contain information that could be used to identify devices individually. Instead, the information in the list will be used to verify that a given device is indeed trustworthy. For instance, in this example, parties A 102, B 104, and C 106 want to communicate among themselves. The devices know their public addresses, however, they do not know who can be trusted at this junction. The thing they have in common is that their public keys/signatures for a pre-determined nonce are in the master list. In order for device B to prove it is indeed trusted, device A 102 will request 126 device B 104 sign the nonce with its private key, and use the public key to verify (challenge). To make sure that a device is indeed the same device in the trusted list, it is challenged with the predetermined nonce that device A used to register with the trusted device 'P' 122. This will permit verification of the digital signature as well. In one example, device 'A' will challenge device 'P'. Device A knows device B's public key, which can be used to verify a signature, and device 'A' will then generate a random number only known by device 'A'. Device 'B' will answer the challenge by signing the random number device 'A' sends to device 'B'.

Figure 1C:
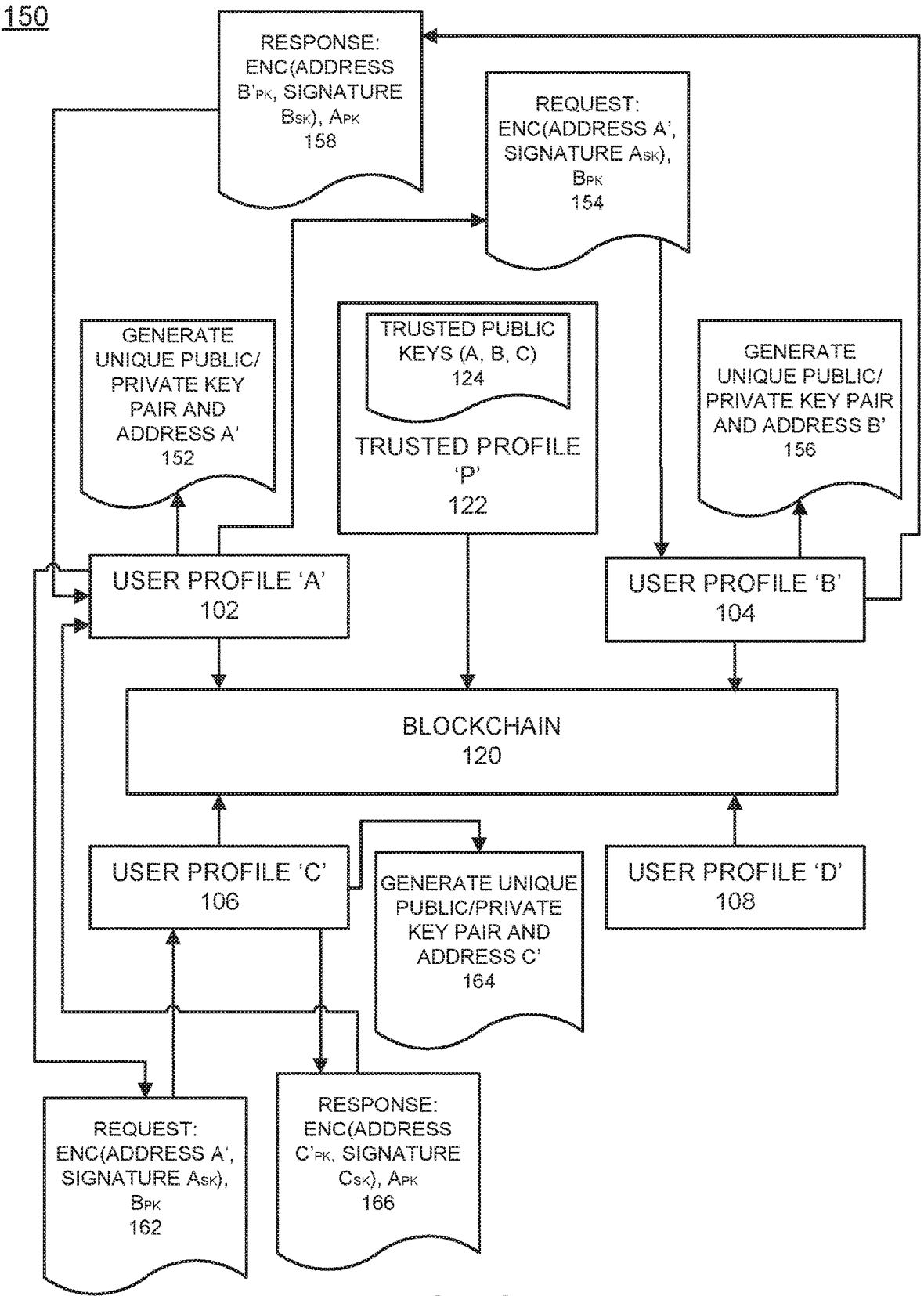
FIG. 1C illustrates a logic configuration of building a trusted group with a blockchain, according to example embodiments.

FIG. 1C illustrates a logic configuration of building a trusted group with a blockchain, according to example embodiments. Referring to FIG. 1C, the configuration 150 for building a trusted group includes device 102 generating a unique public/private key pair and address A 152, sending communication requests 154 and 162 to B 104 and C 106, respectively. The requests include encrypted address 'A', a signature $A_{SK}$, and public keys $B_{PK}$ and $C_{PK}$. The requests have the necessary information to verify that A owns the address and is trusted. For instance, it will transmit its public key $A_{PK}$, which is stored in the trusted list. The devices can challenge 'A' with that public key to verify that 'A' is indeed part of the trusted group. Devices B and C then generate 156
and 164 new public/private key pairs (e.g., new hierarchal deterministic HD child keys), and then send their new addresses $B'_{PK}$ and $C'_{PK}$, and encrypt them with $A_{PK}$ in the response messages 158 and 166. The addresses assigned are derived from public keys and are used to communicate with the users of the blockchain.

Figure 1D:
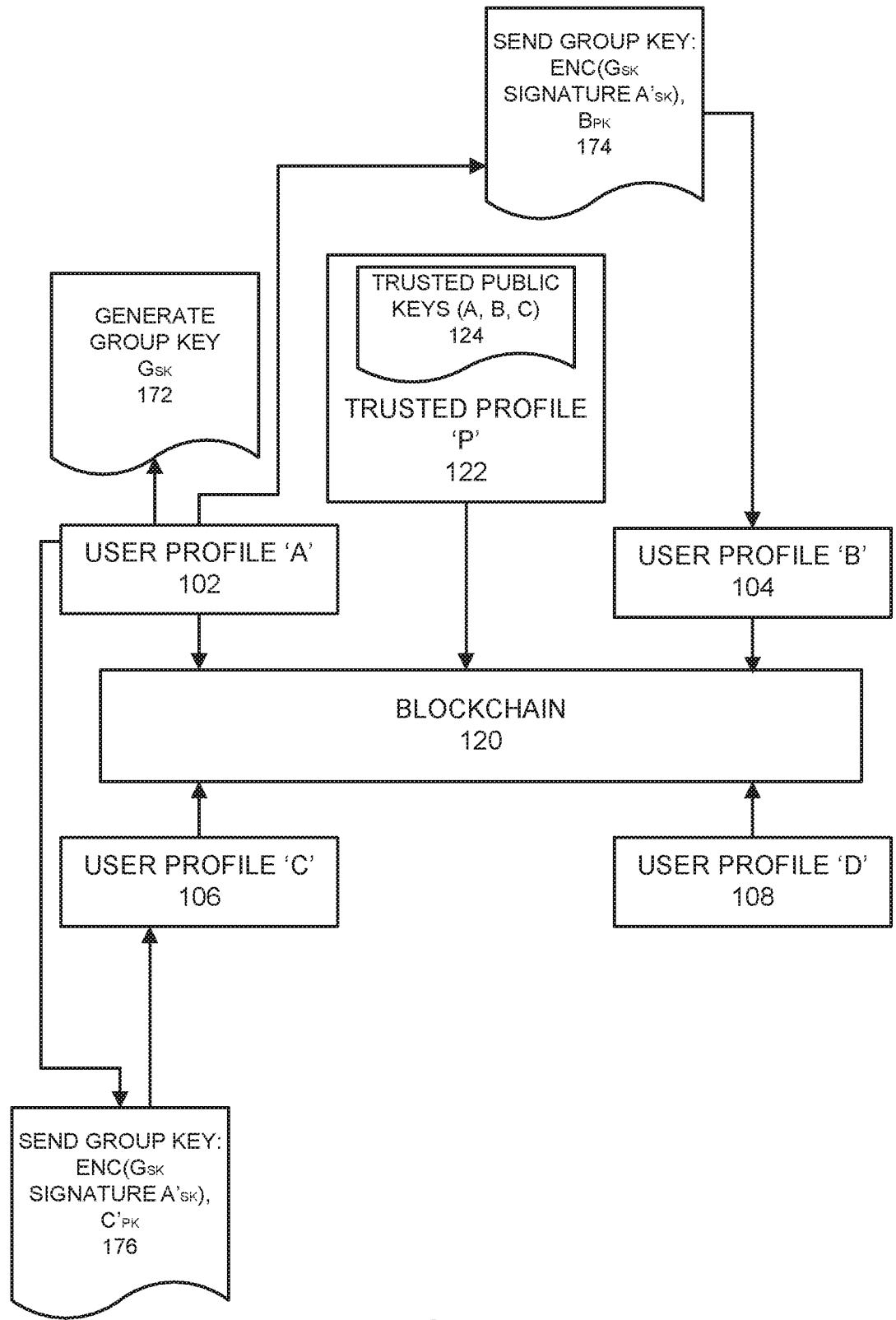
FIG. 1D illustrates another logic configuration of building a trusted group with a blockchain, according to example embodiments.

FIG. 1D illustrates another logic configuration of building a trusted group with a blockchain, according to example embodiments. In FIG. 1D, the process continues in the configuration 170. Next, once the interested parties have exchanged new keys (e.g., ephemeral keys). All messages among themselves will be anonymous within the blockchain 120. 'A' will then generate either a group key $G_{SK}$ (private/public key pair) 172, and/or an access token, such as a web token (e.g., symmetric key with expiration date properties among other metadata). This token/key pair is then used to encrypt future messages exchanged among the group. The messages are part of the blockchain transactions. The messages may be exchanged by sending the group key with encrypted ($G_{SK}$ and signature $A'_{SK}$), $B_{PK}$ 174 for user B and encrypted ($G_{SK}$ and signature $A'_{SK}$), $C'_{PK}$ 176. The public key will work only during a pre-determined time window for which the group needs to communicate and will expire after the time window has matured. Once the group completes its communications, the members can discard the keys. The next time the user devices attempt to communicate, a new group will be created and the process will repeat. Tokens can be discarded or saved for future use efforts. The tokens can be used to decrypt messages for the specific session for which they were created. The blockchain ledger records the metadata needed to validate users. Alternatively, the exchange of messages can be recorded as transactions in the blockchain, recording either the hash of the data, while forwarding the hash onto a distributed hash table (e.g., peer-to-peer) or via an interplanetary file system (IPFS) and/or by adding it to the blockchain.

Figure 2A:
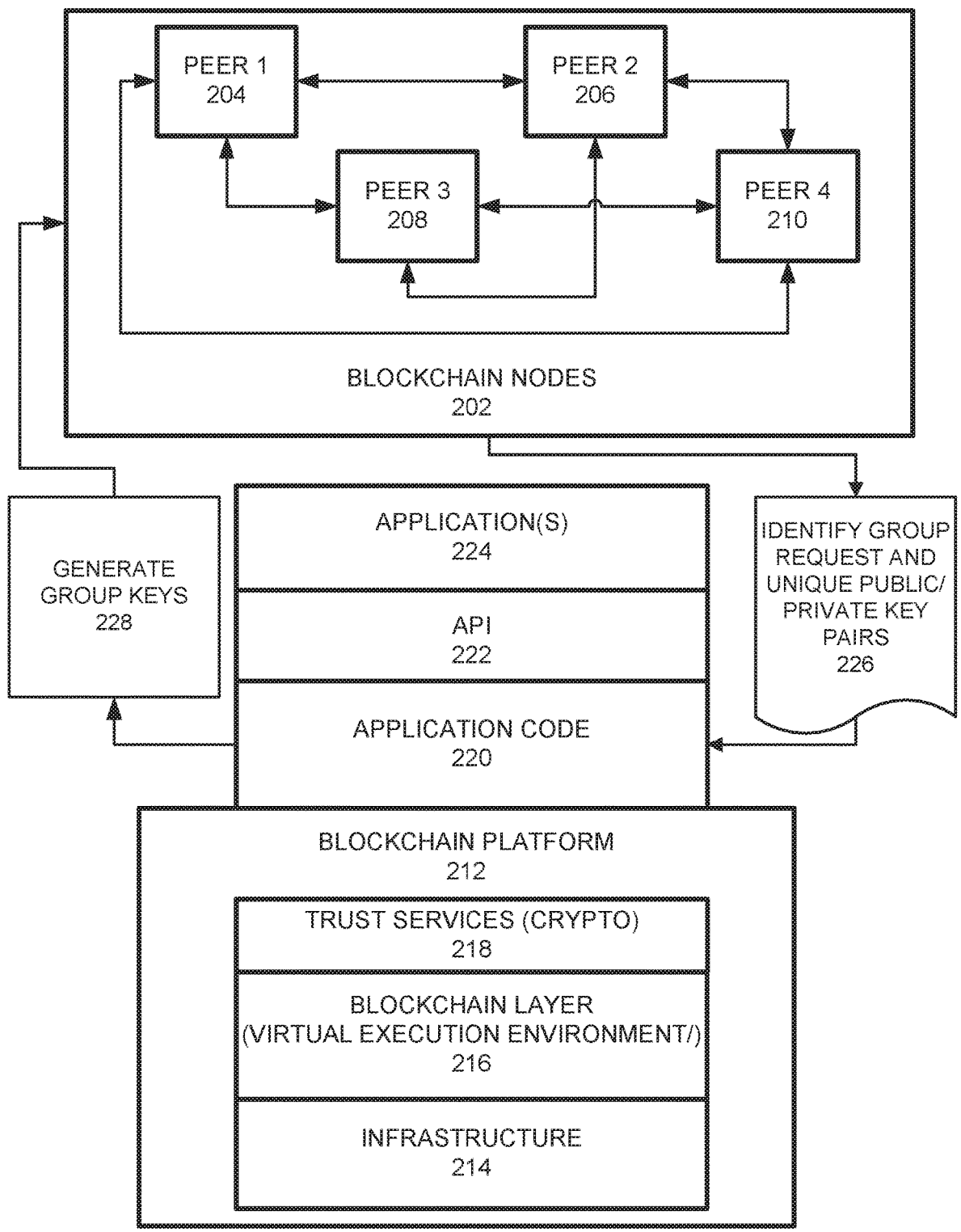
FIG. 2A illustrates an example peer node blockchain architecture configuration for performing blockchain modification operations, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, in one example, the request to setup a group or solicit members to be part of a group may be identified 226 along with unique key pairs. The application code 220 of a smart contract may initiate a group key generation process 228 to create temporary group keys used to encrypt the communications for a certain period of time. Each blockchain participant will have a unique set of keys. The consensus peers can agree on a group key, which will be used to communicate. This is an adhoc way of establishing a common secret among the participants. The group key is different from the individual private keys assigned to the individual blockchain members.

Figure 2B:
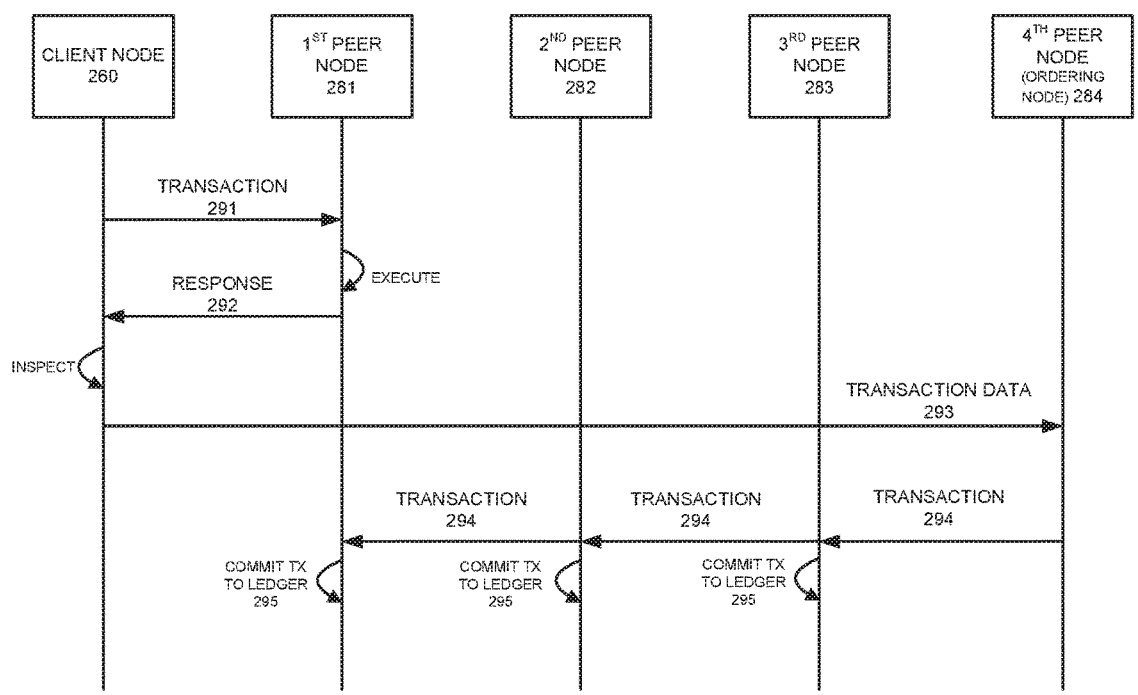
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
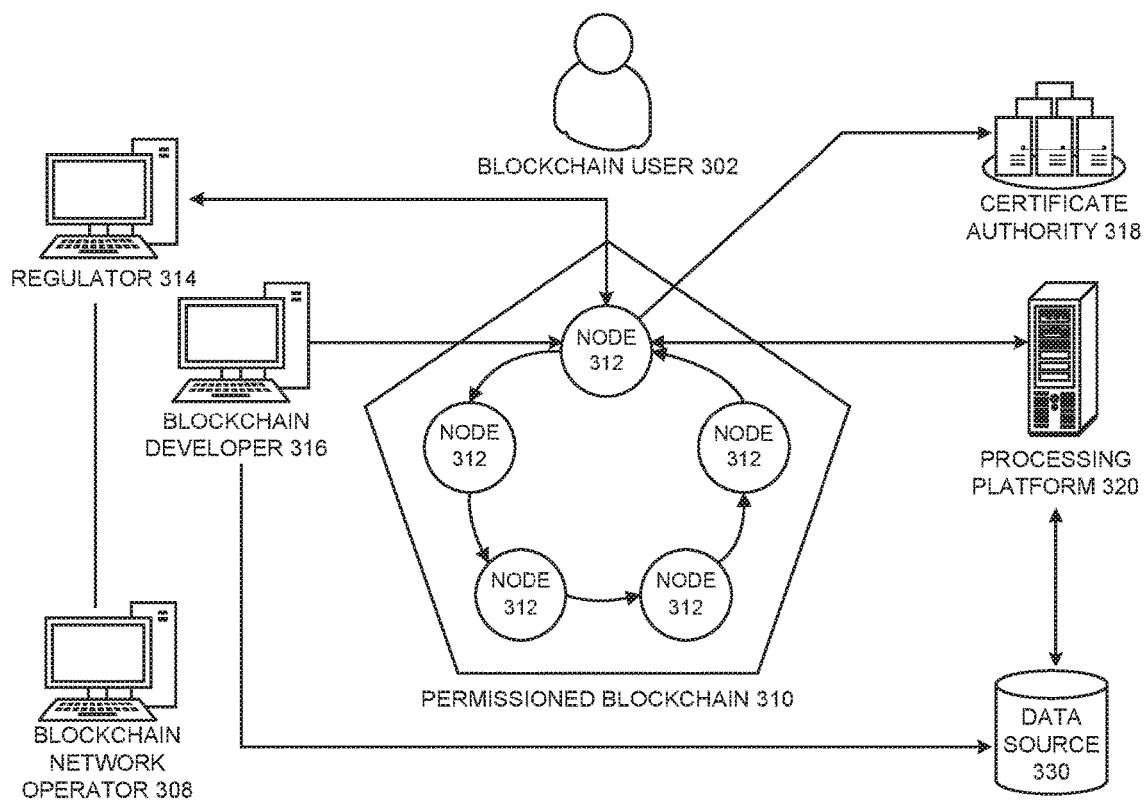
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
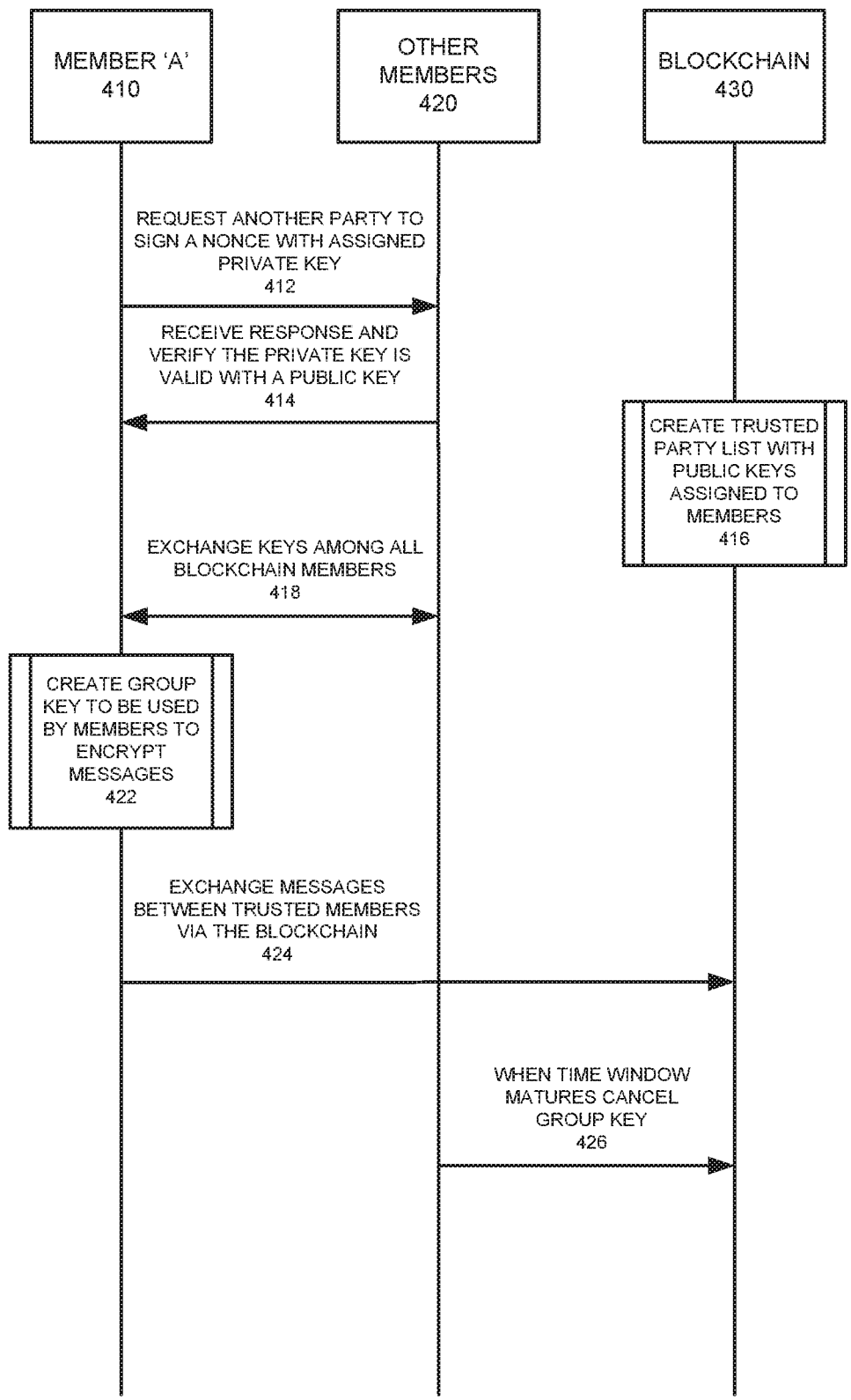
FIG. 4 illustrates a system messaging diagram for creating a trusted group within a blockchain member network, according to example embodiments.

FIG. 4 illustrates a system messaging diagram for creating a trusted group within a blockchain member network, according to example embodiments. Referring to FIG. 4, the process 400 may include one member 410 initiating communication with other members 420. The group creation may start with a request from one member to another to sign a nonce with an assigned key 412. The response to the request may include a verification process to verify the private key is valid by using a public key to verify the keys match 414. The blockchain 430 may store a smart contract with operations required to form a group, a list of trusted parties for a particular group, the nonce used by the keys of the group and all the groups keys and assigned address information 416. The keys are exchanged among members to verify 418 the trusted parties. The members may exchange communications once the parties are trusted and the unique keys are verified. The member 410 may create a group key that members can use to encrypt messages 422. The exchanges of messages 424 may be forwarded to the blockchain 430 for ledger commitment as a medium to share the information. When the group keys expire, the group is no longer value and the access and rights of members may be revoked and identified by a blockchain closing transaction 426 that invalidates the prior keys used to share messages.

Figure 5A:
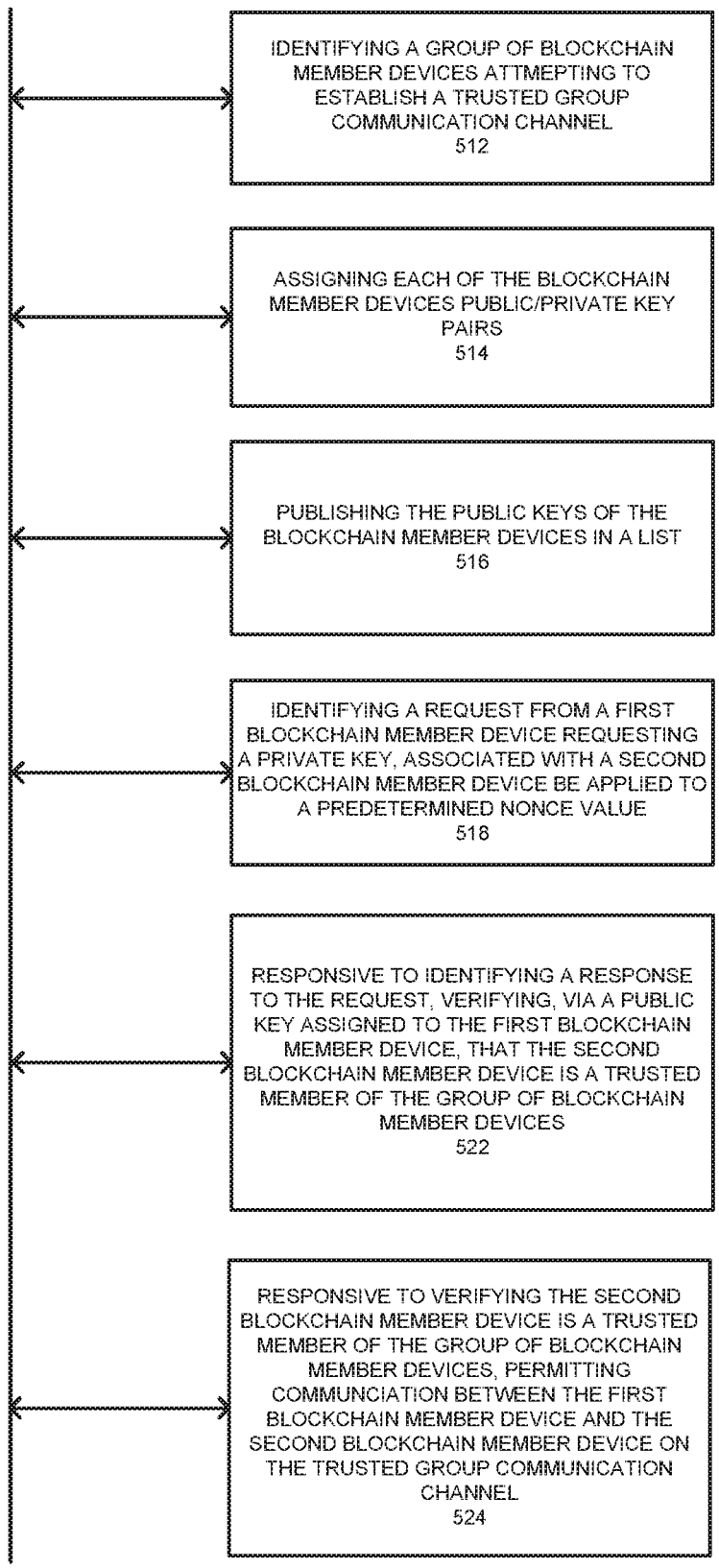
FIG. 5A illustrates a flow diagram of creating a trusted group within a blockchain member network, according to example embodiments.

FIG. 5A illustrates a flow diagram of creating a trusted group within a blockchain member network, according to example embodiments. Referring to FIG. 5A, the method 500 includes identifying a group of blockchain member devices attempting to establish a trusted group communication channel 512, assigning each of the blockchain member devices public/private key pairs 514, publishing the public keys of the blockchain member devices in a list 516, identifying a request from a first blockchain member device requesting a private key, associated with a second blockchain member device, be applied to a predetermined nonce value 518, responsive to identifying a response to the request, verifying, via a public key assigned to the first blockchain member device, that the second blockchain member device is a trusted member of the group of blockchain member devices 522, and responsive to verifying the second blockchain member device is a trusted member of the group of blockchain member devices, permitting communication between the first blockchain member device and the second blockchain member device on the trusted group communication channel 524.

The method may also include assigning each of the blockchain member devices a unique blockchain address to be used for communication on the trusted group communication channel. The public keys may be based on the predetermined nonce value. The request is encrypted with a public key assigned to the second blockchain member device, or in the case with other devices, multiple requests are sent with respective public keys assigned to those devices. Once the group is established, one or more members may generate a group key, and then encrypt messages shared between the blockchain member devices on the trusted group communication channel via the group key. The group key may be assigned a temporary time window during which the encrypted messages may be shared by the blockchain member devices and the group key is created by one of the blockchain member devices.

Figure 5B:
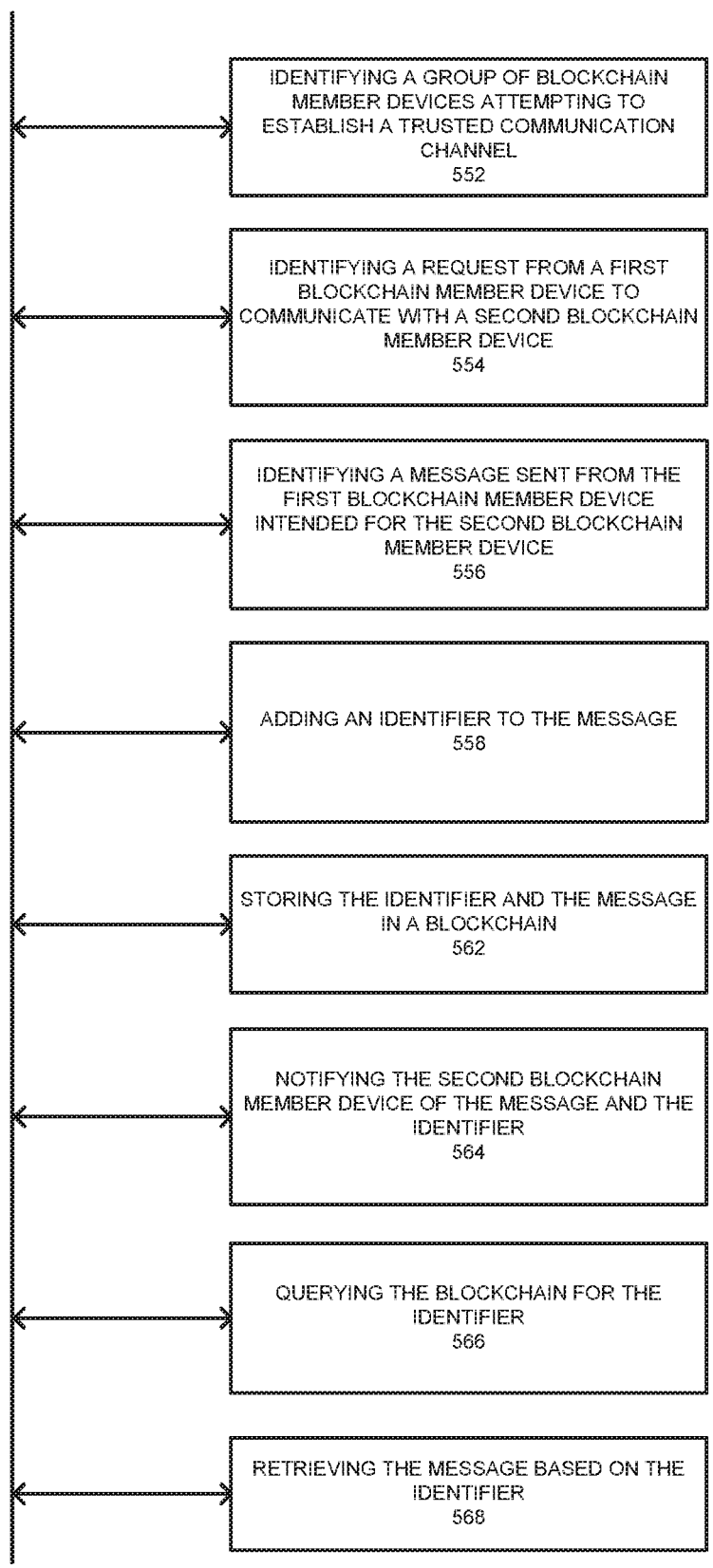
FIG. 5B illustrates a flow diagram of creating a trusted group within a blockchain member network, according to example embodiments.

FIG. 5B illustrates a flow diagram of creating a trusted group within a blockchain member network, according to example embodiments. Referring to FIG. 5B, the method 550 may include identifying a group of blockchain member devices attempting to establish a trusted group communication channel 552, identifying a request from a first blockchain member device to communicate with a second blockchain member device 554, identifying a message sent from the first blockchain member intended for the second blockchain member 556, adding an identifier to the message 558, storing the identifier and the message in a blockchain 562, notifying the second blockchain member device of the message and the identifier 564, querying the blockchain for the identifier 566, and retrieving the message based on the identifier 568.

In addition to establishing a group and customizing tokens and/or keys used for private messaging among blockchain members, a message may be paired with an identifier which is then sent as a reference instrument to the intended recipient. The identifier is stored in the blockchain with the message contents so the intended recipient may reference the identifier to retrieve the message. This enables private messaging by requiring the identifier be known and queried in order to find the message.

Figure 6A:
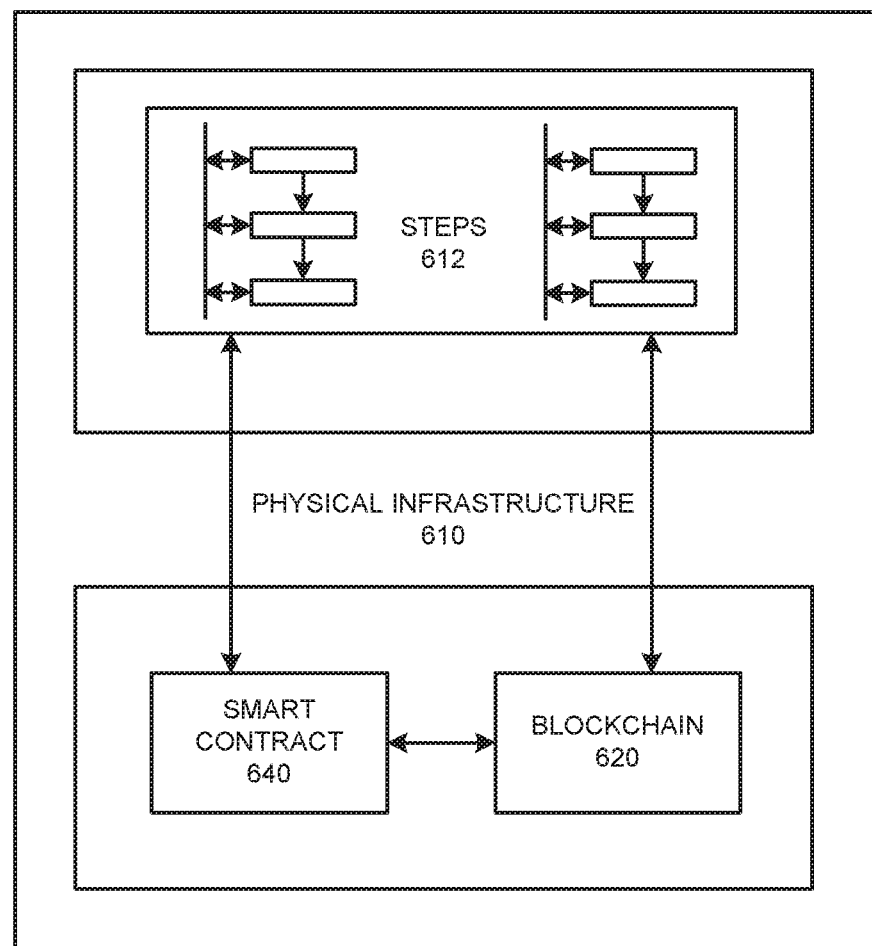
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
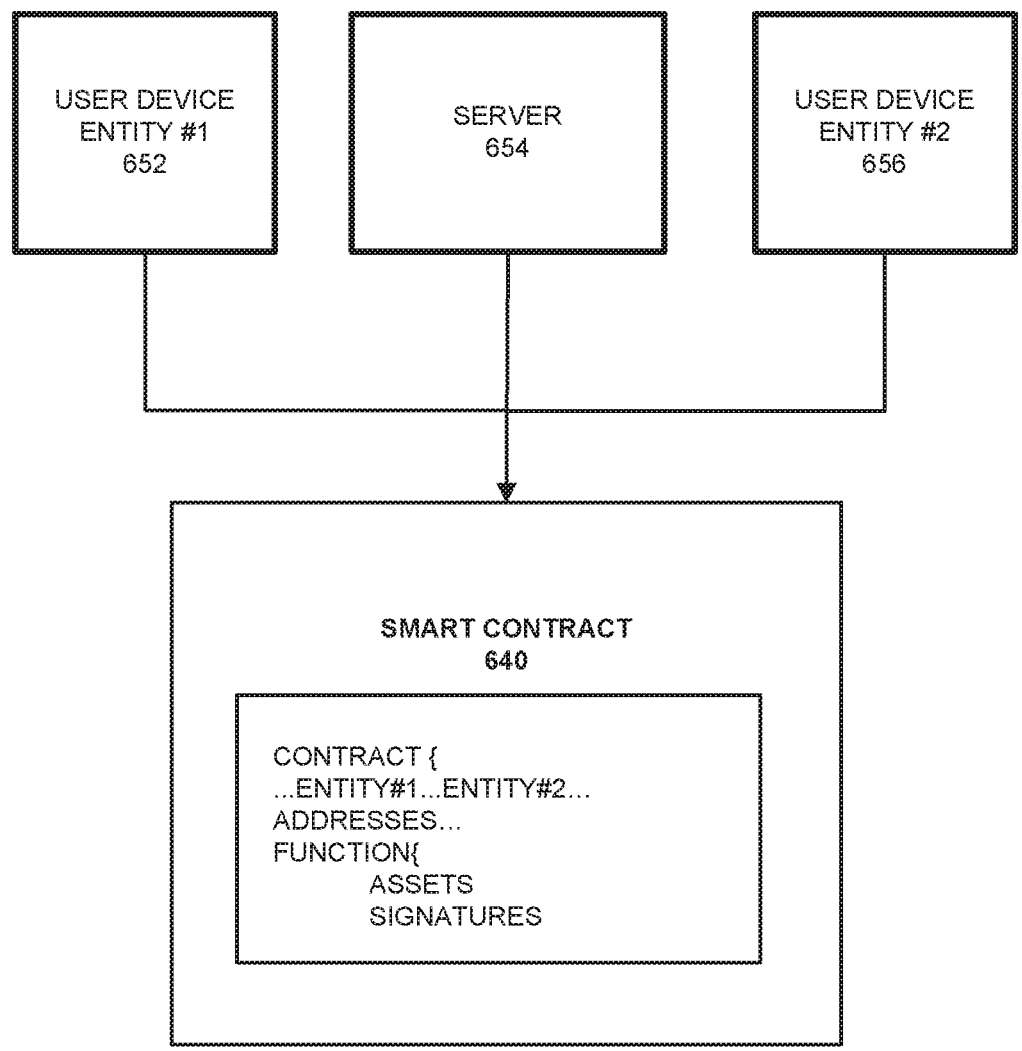
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
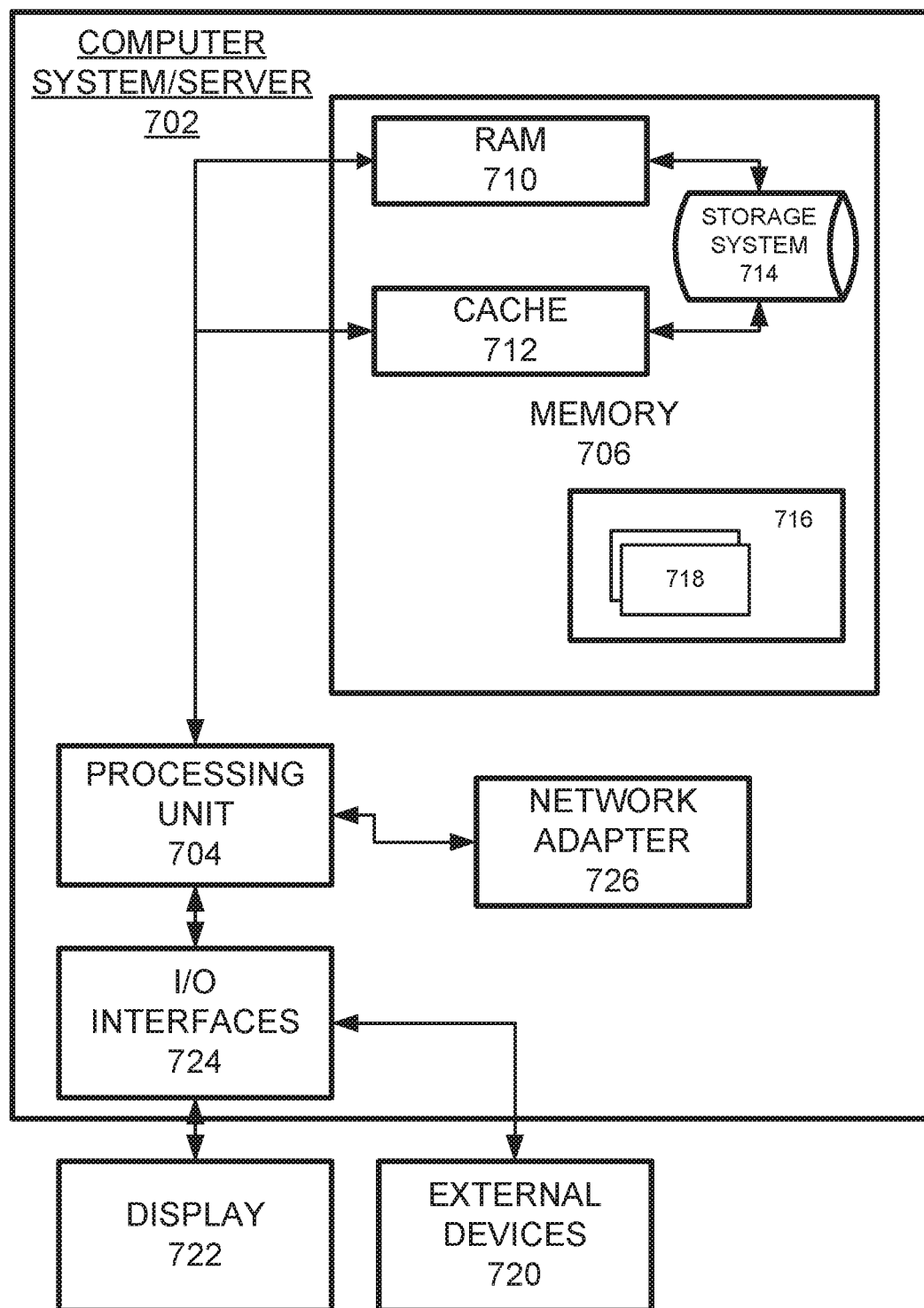
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    identifying a group of blockchain member devices attempting to establish a trusted group communication channel;
    assigning each blockchain member device, of the group of blockchain member devices, a public/private key pair;
    publishing the public keys of the blockchain member devices in a list;
    identifying a request from a first blockchain member device, of the group of blockchain member devices, requesting that a private key associated with a second blockchain member device, of the group of blockchain member devices, be applied to a predetermined nonce value;
    responsive to identifying a response to the request, verifying, via a public key assigned to the first blockchain member device, that the second blockchain member device is a trusted member of the group of blockchain member devices; and
    responsive to the verifying that the second blockchain member device is a trusted member of the group of blockchain member devices, permitting communication between the first blockchain member device and the second blockchain member device on the trusted group communication channel.

2. The method of claim 1, further comprising:
    assigning each of the blockchain member devices a unique blockchain address to be used for communication on the trusted group communication channel.

3. The method of claim 1, wherein the public keys are based on the predetermined nonce value.

4. The method of claim 1, wherein the request is encrypted with a public key assigned to the second blockchain member device.

5. The method of claim 1, further comprising:
    generating a group key; and
    encrypting messages shared between the blockchain member devices on the trusted group communication channel via the group key.

6. The method of claim 5, wherein the group key is assigned a temporary time window during which the encrypted messages may be shared by the blockchain member devices.

7. The method of claim 5, wherein the group key is created by one of the blockchain member devices.

8. A system, comprising:
    a group of blockchain member nodes identified as a trusted group configured to communicate over a trusted group communication channel;
    a computing node configured to
        assign each of the blockchain member node, of the group of blockchain member nodes, a public/private key pair;
        publish the public keys of the blockchain member nodes in a list;
        identify a request from a first blockchain member node, of the group of blockchain member nodes, requesting that a private key associated with a second blockchain member node, of the group of blockchain member nodes, be applied to a predetermined nonce value;
        responsive to a response to the request being identified, verify, via a public key assigned to the first blockchain member node, that the second blockchain member node is a trusted member of the group of blockchain member nodes; and
        responsive to the second blockchain member node being verified as a trusted member of the group of blockchain member nodes, permit communication between the first blockchain member node and the second blockchain member node on the trusted group communication channel.

9. The system of claim 8, wherein the computing node is further configured to:
    assign each of the blockchain member nodes a unique blockchain address to be used for communication on the trusted group communication channel.

10. The system of claim 8, wherein the public keys are based on the predetermined nonce value.

11. The system of claim 8, wherein the request is encrypted with a public key assigned to the second blockchain member node.

12. The system of claim 8, wherein the computing node is further configured to:
    generate a group key; and
    encrypt messages shared between the blockchain member nodes on the trusted group communication channel via the group key.

13. The system of claim 12, wherein the group key is assigned a temporary time window during which the encrypted messages may be shared by the blockchain member nodes.

14. The system of claim 12, wherein the group key is created by one of the blockchain member nodes.

15. A non-transitory computer readable storage medium configured to store one or more instructions that when executed by a processor cause the processor to perform:
    identifying a group of blockchain member devices attempting to establish a trusted group communication channel;
    assigning each blockchain member device, of the group of blockchain member devices, public/private key pair;
    publishing the public keys of the blockchain member devices in a list;
    identifying a request from a first blockchain member device, of the group of blockchain member devices, requesting that a private key associated with a second blockchain member device, of the group of blockchain member devices, be applied to a predetermined nonce value;
    responsive to identifying a response to the request, verifying, via a public key assigned to the first blockchain member device, that the second blockchain member device is a trusted member of the group of blockchain member devices; and responsive to the verifying that the second blockchain member device is a trusted member of the group of blockchain member devices, permitting communication between the first blockchain member device and the second blockchain member device on the trusted group communication channel.

16. The non-transitory computer readable storage medium of claim 15, wherein the one or more instructions further cause the processor to perform:
assigning each of the blockchain member devices a unique blockchain address to be used for communication on the trusted group communication channel.

17. The non-transitory computer readable storage medium of claim 15, wherein the public keys are based on the predetermined nonce value.

18. The non-transitory computer readable storage medium of claim 15, wherein the request is encrypted with a public key assigned to the second blockchain member device.

19. The non-transitory computer readable storage medium of claim 15, wherein the one or more instructions further cause the processor to perform:
generating a group key; and
encrypting messages shared between the blockchain member devices on the trusted group communication channel via the group key.

20. The non-transitory computer readable storage medium of claim 19, wherein the group key is assigned a temporary time window during which the encrypted messages may be shared by the blockchain member devices, and wherein the group key is created by one of the blockchain member devices.

* * * * *